(12) United States Patent
Kumano et al.

(10) Patent No.: US 7,519,255 B2
(45) Date of Patent: Apr. 14, 2009

(54) OPTICAL FIBER

(75) Inventors: Naomi Kumano, Tokyo (JP); Ryuichi Sugizaki, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 11/665,538

(22) PCT Filed: Sep. 22, 2006

(86) PCT No.: PCT/JP2006/318878

§ 371 (c)(1),
(2), (4) Date: Apr. 17, 2007

(87) PCT Pub. No.: WO2007/034923

PCT Pub. Date: Mar. 29, 2007

(65) Prior Publication Data

US 2008/0063348 A1  Mar. 13, 2008

Related U.S. Application Data

(60) Provisional application No. 60/719,594, filed on Sep. 23, 2005.

(51) Int. Cl.
*G02B 6/36* (2006.01)
(52) U.S. Cl. ........................ 385/123; 385/126; 385/127
(58) Field of Classification Search .......... 385/123–128
See application file for complete search history.

(56) References Cited

U.S. PATENT DOCUMENTS 6,421,489 B1 * 7/2002 Berkey et al. ............... 385/123

FOREIGN PATENT DOCUMENTS

| JP | 2001-521204 | | 11/2001 |
| JP | 2004-12685 | | 1/2004 |
| JP | 2005-234433 | * | 2/2005 |
| JP | 2005-234433 | | 9/2005 |

OTHER PUBLICATIONS

Cai, J.-X. et al., "Transmission of Thirty-Eight 40 Gb/s Channels (>1.5 Tb/s) Over Transoceanic Distance", OFC 2002 Postdeadline Papers, FC4-1-FC4-3.

* cited by examiner

*Primary Examiner*—Frank G Font
*Assistant Examiner*—Michael P Mooney
(74) *Attorney, Agent, or Firm*—Oblon, Spivak, McClelland, Maier & Neustadt, P.C.

(57) ABSTRACT

An inner core has a first refractive index. An outer core having a second refractive index lower than the first refractive index is formed on outer circumference of the inner core. A cladding having a refractive index that is higher than the second refractive index and lower than the first refractive index is formed on outer circumference of the outer core. A diameter of the inner core is enlarged, the second refractive index is decreased, and a center core having a refractive index lower than the first refractive index is formed at a center of the inner core, to increase an effective core area while maintaining wavelength dispersion and bending loss.

2 Claims, 4 Drawing Sheets

FIG.2

| No. | Δ1 | Δ2 | α2 | Δ3 | a/b | c/b | b | WAVELENGTH DISPERSION | DISPERSION SLOPE | DPS | Aeff | BENDING LOSS |
|---|---|---|---|---|---|---|---|---|---|---|---|---|
| | % | % | | % | | | μm | ps/nm/km | ps/nm²/km | nm | μm² | dB/m |
| 1 | -0.45 | 0.40 | 4 | -0.30 | 0.32 | 1.35 | 13.3 | 14.50 | 0.063 | 231.9 | 135.2 | <15 |
| 2 | -0.40 | 0.40 | 4 | -0.25 | 0.32 | 1.35 | 13.1 | 14.72 | 0.064 | 231.8 | 134.8 | <10 |
| 3 | -0.35 | 0.40 | 4 | -0.35 | 0.34 | 1.40 | 13.6 | 15.27 | 0.063 | 242.0 | 135.6 | <15 |
| 4 | -0.30 | 0.35 | 4 | -0.45 | 0.30 | 1.40 | 14.8 | 17.90 | 0.064 | 280.2 | 143.7 | <15 |
| 5 | -0.26 | 0.28 | 5 | -0.4 | 0.20 | 1.36 | 15.6 | 20.26 | 0.063 | 320.2 | 146.8 | <5 |
| 6 | -0.25 | 0.35 | 4 | -0.50 | 0.28 | 1.25 | 14.4 | 17.81 | 0.063 | 283.7 | 136.2 | <10 |
| 7 | -0.24 | 0.28 | 5 | -0.55 | 0.22 | 1.36 | 16.0 | 20.51 | 0.064 | 320.2 | 151.2 | <10 |
| 8 | -0.20 | 0.35 | 4 | -0.25 | 0.30 | 1.25 | 13.5 | 16.80 | 0.064 | 263.6 | 139.8 | <15 |
| 9 | -0.15 | 0.35 | 4 | -0.35 | 0.30 | 1.30 | 14.1 | 17.93 | 0.063 | 283.5 | 136.6 | <10 |
| 10 | -0.12 | 0.28 | 5 | -0.5 | 0.26 | 1.36 | 15.3 | 20.26 | 0.063 | 320.1 | 145.0 | <10 |
| 11 | -0.10 | 0.35 | 4 | -0.35 | 0.30 | 1.20 | 13.8 | 17.74 | 0.063 | 280.9 | 135.3 | <5 |
| 12 | -0.08 | 0.28 | 5 | -0.55 | 0.28 | 1.36 | 15.7 | 20.49 | 0.064 | 320.2 | 151.3 | <10 |
| 13 | -0.06 | 0.28 | 5 | -0.45 | 0.28 | 1.36 | 15.5 | 20.31 | 0.063 | 320.0 | 150.6 | <10 |
| 14 | -0.05 | 0.27 | 6 | -0.35 | 0.28 | 1.40 | 15.0 | 20.10 | 0.063 | 320.2 | 148.0 | <10 |
| 15 | -0.02 | 0.28 | 5 | -0.55 | 0.22 | 1.36 | 16.2 | 21.68 | 0.064 | 338.8 | 145.1 | <5 |
| 16 | -0.02 | 0.28 | 5 | -0.4 | 0.30 | 1.36 | 15.3 | 20.20 | 0.063 | 320.1 | 150.5 | <10 |

FIG.3

| No. | Δ1 % | Δ2 % | α2 | Δ3 % | a/b | c/b | b μm | WAVELENGTH DISPERSION ps/nm/km | DISPERSION SLOPE ps/nm²/km | DPS nm | Aeff μm² | BENDING LOSS dB/m |
|---|---|---|---|---|---|---|---|---|---|---|---|---|
| 17 | -0.01 | 0.29 | 2 | -0.45 | 0.32 | 1.35 | 17.3 | 20.72 | 0.065 | 320.3 | 171.1 | <10 |
| 18 | -0.01 | 0.29 | 2 | -0.35 | 0.32 | 1.35 | 16.2 | 20.21 | 0.063 | 320.3 | 158.5 | <15 |
| 19 | 0.00 | 0.30 | 5 | -0.55 | 0.35 | 1.50 | 14.8 | 20.81 | 0.065 | 320.2 | 140.0 | <10 |
| 20 | 0.00 | 0.28 | 5 | -0.55 | 0.24 | 1.30 | 16.1 | 21.41 | 0.063 | 337.6 | 145.4 | <5 |
| 21 | 0 | 0.28 | 4 | -0.5 | 0.32 | 1.34 | 16.8 | 20.71 | 0.065 | 320.0 | 170.0 | <10 |
| 22 | 0.02 | 0.28 | 5 | -0.55 | 0.26 | 1.34 | 16.1 | 21.51 | 0.064 | 337.0 | 147.5 | <5 |
| 23 | 0.02 | 0.28 | 4 | -0.55 | 0.34 | 1.38 | 17.0 | 20.95 | 0.065 | 320.1 | 173.1 | <10 |
| 24 | 0.02 | 0.28 | 4 | -0.45 | 0.34 | 1.34 | 16.2 | 20.51 | 0.064 | 320.3 | 163.5 | <10 |
| 25 | 0.03 | 0.33 | 2 | -0.35 | 0.32 | 1.40 | 16.3 | 20.64 | 0.065 | 320.0 | 151.9 | <5 |
| 26 | 0.03 | 0.29 | 2 | -0.55 | 0.32 | 1.45 | 18.4 | 21.50 | 0.066 | 324.9 | 180.7 | <10 |
| 27 | 0.03 | 0.29 | 2 | -0.40 | 0.32 | 1.45 | 18.1 | 21.16 | 0.066 | 322.7 | 180.2 | <10 |
| 28 | 0.03 | 0.29 | 2 | -0.35 | 0.32 | 1.35 | 17.8 | 20.80 | 0.065 | 321.7 | 178.6 | <5 |
| 29 | 0.03 | 0.27 | 6 | -0.35 | 0.32 | 1.35 | 16.0 | 20.45 | 0.064 | 321.3 | 165.9 | <5 |
| 30 | 0.06 | 0.28 | 5 | -0.55 | 0.28 | 1.40 | 16.2 | 21.80 | 0.064 | 338.5 | 148.7 | <10 |
| 31 | 0.10 | 0.45 | 4 | -0.40 | 0.55 | 1.20 | 12.6 | 16.55 | 0.065 | 253.2 | 137.0 | <10 |
| 32 | 0.15 | 0.40 | 4 | -0.35 | 0.55 | 1.20 | 12.9 | 18.28 | 0.063 | 290.2 | 135.3 | <10 |
| 33 | 0.20 | 0.45 | 4 | -0.40 | 0.70 | 1.15 | 12.6 | 18.83 | 0.062 | 304.1 | 135.1 | <10 |
| 34 | 0.20 | 0.35 | 4 | -0.30 | 0.59 | 1.32 | 14.0 | 20.43 | 0.062 | 332.1 | 137.6 | <5 |

OPTICAL FIBER

TECHNICAL FIELD

The present invention relates to an optical fiber mainly used in a long-haul optical transmission line.

BACKGROUND ART

A dispersion-managed optical transmission line has been proposed as a long-haul optical transmission line such as a submarine cable. In the dispersion-managed optical transmission line, a wavelength dispersion of the optical transmission line is managed by combining a positive-dispersion optical fiber having a positive wavelength-dispersion and a negative-dispersion optical fiber having a negative wavelength-dispersion at a wavelength of a signal light.

A technology of transmitting a 40-Gb/s optical signal over a distance of 6,000 km using the dispersion-managed optical transmission line is disclosed in Nonpatent literature 1. In this dispersion-managed optical transmission line, a positive-dispersion optical fiber having a wavelength dispersion of 20 ps/nm/km and an effective core area of 110 $\mu m^2$ and a negative-dispersion optical fiber having a wavelength dispersion of 40 ps/nm/km and an effective core area of 30 $\mu m^2$ at a wavelength of 1,550 nm are combined to suppress an accumulated dispersion in the optical transmission line to almost zero. Both of the optical fibers used in the dispersion-managed optical transmission line have a bending loss of equal to or smaller than 15 dB/m when the optical fibers are wound 16 times with a diameter of 20 mm.

As for the positive-dispersion optical fiber, a conventional optical fiber having a W-type refractive index profile is used, which includes an inner core portion, an outer core layer formed on an outer circumference of the inner core portion, with a refractive index lower than that of the inner core portion, and a cladding layer formed on an outer circumference of the outer core layer, with a refractive index higher than that of the outer core layer and lower than that of the inner core portion.

Nonpatent literature 1: J. -X. Cai, et al, OFC 2002, PD-FC4 (2002), "Transmission of Thirty-Eight 40 gigabits per second (Gb/s) Channels (>1.5 terabits per second (Tb/s)) Over Transoceanic Distance"

DISCLOSURE OF INVENTION

Problem to be Solved by the Invention

In the dispersion-managed optical transmission line such as the submarine cable, there is a demand, for example, for extending a transmission distance up to 10,000 km that is a distance to transverse the Pacific Ocean. One of the factors that limit a distance of the optical transmission line is an occurrence of nonlinear optical phenomena inside the optical fiber. Therefore, it can be viewed as a method of extending the distance of the optical transmission line to suppress the occurrence of nonlinear optical phenomena inside the positive-dispersion optical fiber by increasing the effective core area of the positive-dispersion optical fiber.

However, the conventional optical fiber has a problem that other optical characteristics are also changed if the effective core area is increased by, for example, changing a design of the refractive index profile. In particular, because the wavelength dispersion is increased with an increase of the effective core area, a design of the dispersion management should be changed accordingly. On the other hand, if it is attempted to increase the effective core area while maintaining the wavelength dispersion, a bending loss is increased. Therefore, a transmission loss can be increased when placing a transmission line, which will be turned out to be an obstacle to extending the transmission distance.

The present invention is made in consideration of the above problems, and it is an object of the present invention to provide an optical fiber having a considerably large effective core area with a wavelength dispersion and a bending loss equivalent to those of the conventional optical fiber.

Means For Solving Problem

To solve the above problems and to achieve the object, an optical fiber according to the present invention includes an inner core portion, an outer core layer formed on an outer circumference of the inner core portion, with a refractive index lower than that of the inner core portion, and a cladding layer formed on an outer circumference of the outer core layer, with a refractive index higher than that of the outer core layer and lower than that of the inner core portion. An outer diameter of the inner core portion is enlarged, the refractive index of the outer core layer is decreased, and a center core portion is formed at a center of the inner core portion, with a refractive index lower than that of the inner core portion, so that an effective core area is increased while maintaining a wavelength dispersion and a bending loss.

Furthermore, the optical fiber according to the present invention has the wavelength dispersion of 12 ps/nm/km to 22 ps/nm/km at a wavelength of 1,550 nm, the bending loss of equal to or smaller than 15 dB/m when the optical fiber is wound 16 times with a diameter of 20 mm, and the effective core area of 135 $\mu m^2$ to 200 $\mu m^2$.

Moreover, the optical fiber according to the present invention has a relative refractive index difference $\Delta 1$ of the center core portion to the cladding layer of −0.45% to 0.25%, a relative refractive index difference $\Delta 2$ of the inner core portion to the cladding layer of 0.25% to 0.50%, a value $\alpha$ representing a refractive index distribution profile of the inner core portion of equal to or larger than 2, a relative refractive index difference $\Delta 3$ of the outer core layer to the cladding layer of −0.55% to −0.25%, a ratio a/b of a diameter of the center core portion to the outer diameter of the inner core portion of 0.2 to 0.7, a ratio c/b of an outer diameter of the outer core layer to the outer diameter of the inner core portion of 1.1 to 1.5, and the outer diameter b of the inner core portion of 12 $\mu m$ to 20 $\mu m$.

EFFECT OF THE INVENTION

According to the present invention, it is possible to realize an optical fiber having a considerably large effective core area with a wavelength dispersion and a bending loss equivalent to those of the conventional optical fiber by enlarging an outer diameter of an inner core portion, decreasing a refractive index of an outer core layer, and forming a center core portion at a center of the inner core portion, with a refractive index lower than that of the inner core portion, so that the effective core area is increased while maintaining the wavelength dispersion and the bending loss.

BRIEF DESCRIPTION OF DRAWINGS

FIG. 2 is a table of setting values of parameters representing the refractive index profile of the optical fiber according to the embodiment of the present invention and optical characteristics of the optical fiber obtained by a numerical calculation.

FIG. 3 is a table of setting values of parameters representing the refractive index profile of the optical fiber according to the embodiment of the present invention and optical characteristics of the optical fiber obtained by a numerical calculation.

EXPLANATIONS OF LETTERS OR NUMERALS

1 Center core portion
2 Inner core portion
3 Outer core layer
4 Cladding layer
5 Refractive index profile

BEST MODE(S) FOR CARRYING OUT THE INVENTION

Exemplary embodiments of an optical fiber according to the present invention will be explained in detail below with reference to the accompanying drawings. It should be noted that the present invention is not limited to the embodiments. Terms not defined particularly in the specification conform to the definition and the measurement method in ITU-T G. 650. 1.

EMBODIMENT

Figure 1:
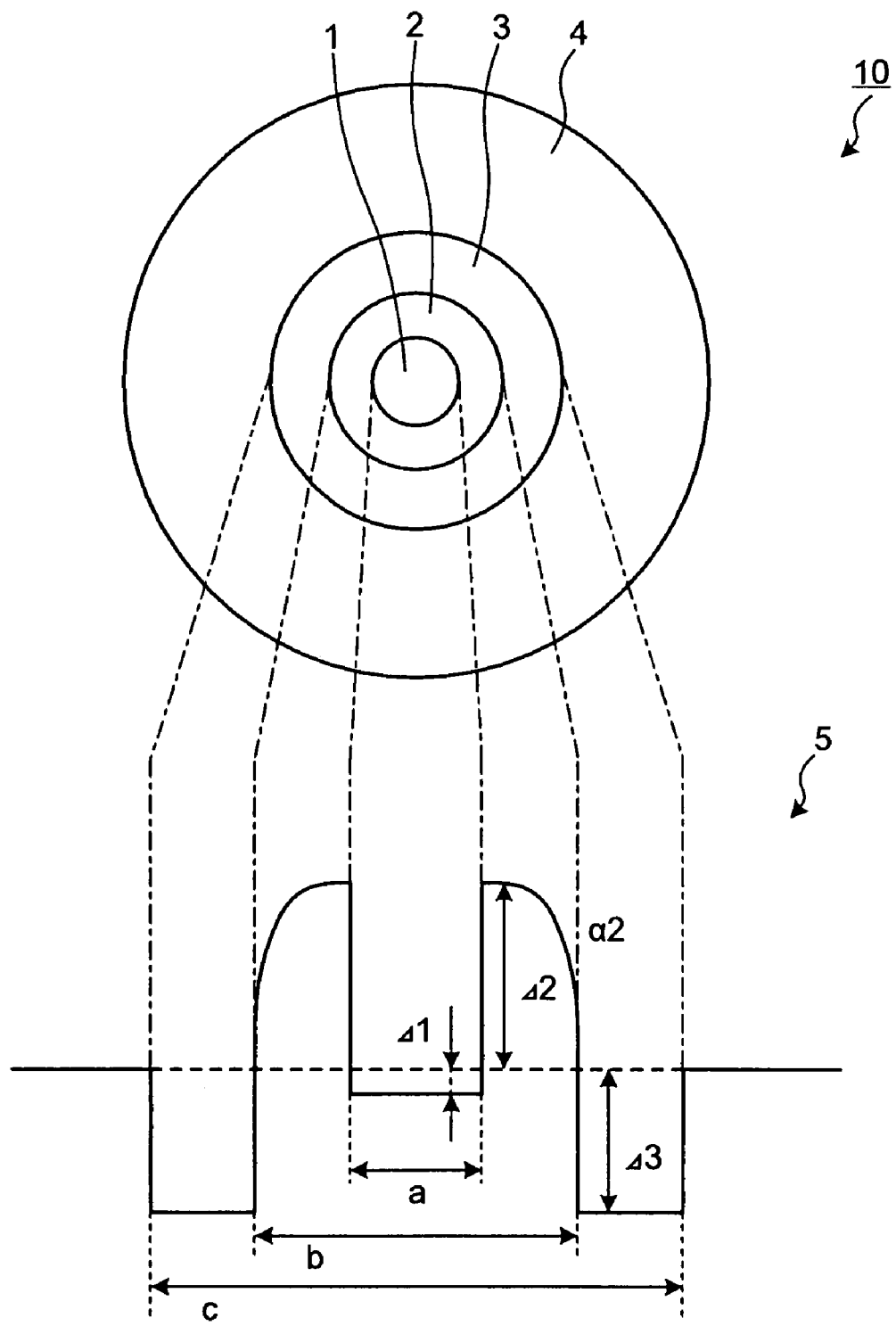
FIG. 1 is a schematic diagram for explaining a refractive index profile corresponding to a cross section of an optical fiber according to an embodiment of the present invention.

FIG. 1 is a schematic diagram for explaining a refractive index profile corresponding to a cross section of an optical fiber according to an embodiment of the present invention. The optical fiber 10 is obtained from an optical fiber having a W-type refractive index profile, which includes an inner core portion 2, an outer core layer 3 formed on an outer circumference of the inner core portion 2, with a refractive index lower than that of the inner core portion 2, and a cladding layer 4 formed on an outer circumference of the outer core layer 3, with a refractive index higher than that of the outer core layer 3 and lower than that of the inner core portion 2, by enlarging an outer diameter of the inner core portion 2, decreasing the refractive index of the outer core layer 3, and forming a center core portion 1 at a center of the inner core portion 2, with a refractive index lower than that of the inner core portion 2, so that an effective core area is increased while maintaining a wavelength dispersion and a bending loss.

In a conventional optical fiber having a W-type refractive index profile, when the outer diameter of the inner core portion is enlarged to increase the effective core area, it is difficult to maintain both the wavelength dispersion and the bending loss in a balanced manner even if other parameters defining the refractive index profile is optimized. Therefore, in the optical fiber 10, the refractive index of the outer core layer 3 is decreased, and the center core portion 1 having a refractive index lower than that of the inner core portion 2 is formed at the center of the inner core portion 2, to increase the effective core area while maintaining the wavelength dispersion and the bending loss. The center core portion 1, the inner core portion 2, and the outer core layer 3 are made of a silica glass of which the refractive index is controlled by doping a predetermined amount of dopant for controlling the refractive index, such as a germanium and a fluorine, and the cladding layer 4 is made of a silica glass that does not contain the dopant for controlling the refractive index.

As for the optical characteristics of the optical fiber 10, the wavelength dispersion is 12 ps/nm/km to 22 ps/nm/km at the wavelength of 1,550 nm, the bending loss is equal to or smaller than 15 dB/m when the optical fiber is wound 16 times with a diameter of 20 mm, and the effective core area is 135 $\mu m^2$ to 200 $\mu m^2$, so that a considerably large effective core area is realized while maintaining the wavelength dispersion and the bending loss equivalent to those of the conventional positive-dispersion optical fiber used in the dispersion-managed optical transmission line.

The parameters defining the refractive index profile of the optical fiber 10 will be explained in detail below by referring to a refractive index profile 5 shown in FIG. 1. In the optical fiber 10, a relative refractive index difference $\Delta 1$ of the center core portion 1 to the cladding layer 4 is −0.45% to 0.25%, a relative refractive index difference $\Delta 2$ of the inner core portion 2 to the cladding layer is 0.25% to 0.50%, a value $\alpha$ representing a refractive index distribution profile of the inner core portion 2 is equal to or larger than 2, a relative refractive index difference $\Delta 3$ of the outer core layer 3 to the cladding layer 4 is −0.55% to −0.25%, a ratio a/b of a diameter of the center core portion 1 to the outer diameter of the inner core portion 2 is 0.2 to 0.7, a ratio c/b of an outer diameter of the outer core layer 3 to the outer diameter of the inner core portion 2 is 1.1 to 1.5, and the outer diameter b of the inner core portion 2 is 12 $\mu m$ to 20 $\mu m$. As a result, the above wavelength dispersion, bending loss, and effective core area are realized at the wavelength of 1,550 nm. Because $\Delta 1$ is in the above range, the wavelength dispersion and the bending loss can be maintained in a balanced manner, and because $\Delta 2$ is in the above range, the effective core area can be increased while maintaining the bending loss at the wavelength of 1,550 nm.

The relative refractive index differences $\Delta 1$, $\Delta 2$, and $\Delta 3$ are defined by Equations (1), (2), and (3), respectively.

$$\Delta 1 = \{(n_1^2 - n_c^2)/(2n_c^2)\} \times 100 [\%] \tag{1}$$

$$\Delta 2 = \{(n_2^2 - n_c^2)/(2n_c^2)\} \times 100 [\%] \tag{2}$$

$$\Delta 3 = \{(n3^2 - n_c^2)/(2n_c^2)\} \times 100 [\%] \tag{3}$$

In the above equations, $n_1$ is a minimum refractive index of the center core portion 1, $n_2$ is a maximum refractive index of the inner core portion 2, n3 is a minimum refractive index of the outer core layer 3, and $n_c$ is the refractive index of the cladding layer 4.

When the value $\alpha$ representing the refractive index distribution profile of the inner core portion 2 is given as $\alpha 2$, $\alpha 2$ is defined by Equation (4).

$$n^2(r) = n_2^2 \{1 - 2(\Delta 2/100) \times ((r - amax)/(b/2 - amax))^{\alpha 2}\} \tag{4}$$

where $a/2 \leq r < b/2$.

In the above equation, r represents a position from a center of the optical fiber in a radial direction. amax is a position from the center of the optical fiber at a point having a largest relative refractive index difference to the cladding layer 4 in the radial direction in a range of $a/2 < r < b/2$, and when amax is not a single point but is distributed over a wide range, a point at a center of the distribution is taken. In FIG. 1, amax=a/2. n(r) represents a refractive index at the position r, and the symbol "^" indicates an exponential.

The diameter a of the center core portion 1 is a diameter at a position where the relative refractive index difference is ½ of (Δ2−Δ1) at a boundary area between the center core portion 1 and the inner core portion 2. The outer diameter b of the inner core portion 2 is a diameter at a position where the relative refractive index difference is 1/10 of Δ2 at a boundary area between the inner core portion 2 and the outer core layer 3. The outer diameter c of the outer core layer 3 is a diameter at a position where the relative refractive index difference is ½ of Δ3 at a boundary between the outer core layer 3 and the cladding layer 4.

A result of calculation of the optical characteristics of the optical fiber according to the embodiment obtained by a numerical simulation is explained below. FIGS. 2 and 3 are tables of setting values of parameters representing the refractive index profile of the optical fiber according to the embodiment and optical characteristics of the optical fiber obtained by the calculation. In FIGS. 2 and 3, DPS (dispersion per slope) indicates a value obtained by dividing the wavelength dispersion by the dispersion slope. Aeff represents the effective core area. The bending loss is a value obtained from 16 times of winding with a diameter of 20 mm. All of wavelength dispersion, dispersion slope, DPS, Aeff, and bending loss are values at the wavelength of 1,550 nm.

All of the optical fibers from No. 1 to No. 34 have Δ1 of −0.45% to 0.25%, Δ2 of 0.25% to 0.50%, α2 of equal to or larger than 2, Δ3 of −0.55% to −0.25%, a/b of 0.2 to 0.7, c/b of 1.1 to 1.5, and b of 12 μm to 20 μm for the setting values of the parameters. As a result, the optical characteristics obtained by the calculation show that the wavelength dispersion is 12 ps/nm/km to 22 ps/nm/km, the bending loss is equal to or smaller than 15 dB/m, and the effective core area is 135 μm² to 200 μm².

Figure 4:
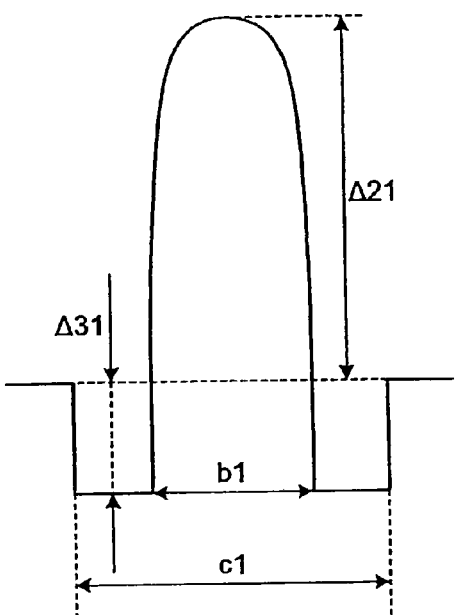
FIG. 4 is a schematic diagram for explaining a refractive index profile of an optical fiber according to a conventional example.

A relation between the bending loss and the effective core area with the same wavelength dispersion is compared between an optical fiber having a conventional W-type refractive index profile and the optical fiber according to the embodiment. FIG. 4 is a schematic diagram for explaining a refractive index profile of an optical fiber according to a conventional example. For the optical fiber according to the conventional example, the bending loss and the effective core area were obtained by performing calculations by numerical simulations for several types of optical fibers with a relative refractive index difference Δ21 of the inner core portion to the cladding layer set to 0.24% to 0.30%, a relative refractive index difference Δ31 of the outer core layer to the cladding layer set to −0.50% to −0.02%, a ratio b1/c1 of a diameter b1 of the inner core portion to a diameter c1 of the outer core layer set to 0.35 to 0.85, and an outer diameter c1 of the outer core layer set to 15 to 40, so that the wavelength dispersion becomes 18 ps/nm/km at the wavelength of 1,550 nm and a cut-off wavelength becomes 1,500 nm. In the same manner, for the optical fiber according to the embodiment, the bending loss and the effective core area were obtained by performing calculations by numerical simulations for several types of optical fibers with parameters set so that the wavelength dispersion becomes 18 ps/nm/km at the wavelength of 1,550 nm and the cut-off wavelength becomes 1,500 nm.

Figure 5:
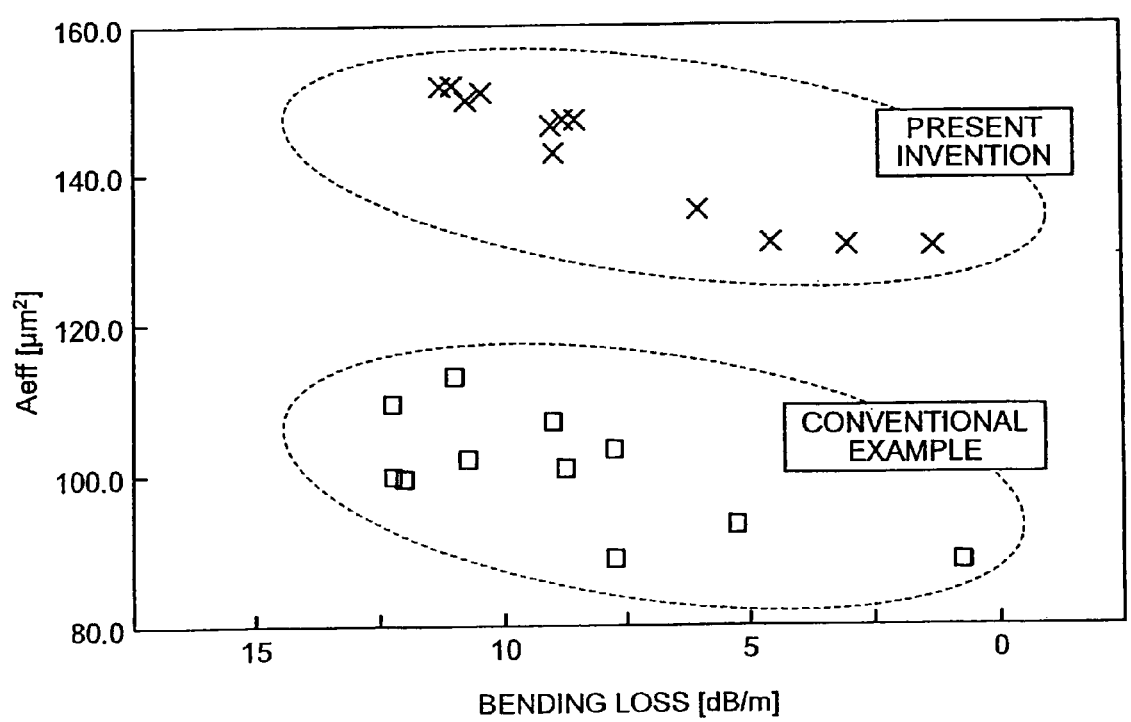
FIG. 5 is a graph of a relation between a bending loss and an effective core area for the optical fiber according to the embodiment of the present invention and the optical fiber according to the conventional example at the same wavelength dispersion.

FIG. 5 is a graph of a comparison of the relation between the bending loss and the effective core area for the optical fiber according to the embodiment and the optical fiber according to the conventional example at the same wavelength dispersion. As shown in FIG. 5, all of the optical fibers according to the embodiment have a larger effective core area than the optical fibers according to the conventional example even with the same bending loss. In other words, the optical fiber according to the embodiment can increase the effective core area while maintaining the wavelength dispersion and the bending loss, compared to the optical fiber according to the conventional example. Therefore, it is possible to increase the effective core area from a conventional value of about 100 μm² to about 150 μm² while maintaining, for example, the wavelength dispersion to 18 ps/nm/km and the bending loss to 10 dB/m.

INDUSTRIAL APPLICABILITY

The optical fiber according to the present invention is suitable for use in a long-haul dispersion-managed optical transmission line, such as a submarine cable, as the positive-dispersion optical fiber.

The invention claimed is:

1. An optical fiber, comprising:
   an inner core portion having a first refractive index;
   an outer core layer formed on an outer circumference of the inner core portion, the outer core layer having a second refractive index lower than the first refractive index; and
   a cladding layer formed on an outer circumference of the outer core layer, the cladding layer having a third refractive index higher than the second refractive index and lower than the first refractive index, wherein
   an outer diameter of the inner core portion is enlarged, the second refractive index decreased, and a center core portion is formed at a center of the inner core portion, with a refractive index lower than the first refractive index, so that an effective core area is increased while maintaining a wavelength dispersion and bending loss, wherein
   the wavelength dispersion is 12 ps/nm/km to 22 ps/nm/km at a wavelength of 1,550 nanometers,
   the bending loss is equal to or smaller than 15 dB/m when the optical fiber is wound 16 times with a diameter of 20 millimeters at a wavelength of 1,550 nanometers,
   the effective core area is 140 μm² to 200 μm² at a wavelength of 1,550 nanometers, and
   a dispersion slope is equal to or smaller than 0.066 ps/nm²/km.

2. The optical fiber according to claim 1, wherein
   a relative refractive index difference of the center core portion to the cladding layer is −0.45% to 0.25%,
   a relative refractive index difference of the inner core portion to the cladding layer is 0.25% to 0.50%,
   a value α representing a refractive index distribution profile of the inner core portion is equal to or larger than 2,
   a relative refractive index difference of the outer core layer to the cladding layer is −0.55% to −0.25%,
   a ratio of a diameter of the center core portion to the outer diameter of the inner core portion is 0.2 to 0.7,
   a ratio of an outer diameter of the outer core layer to the outer diameter of the inner core portion is 1.1 to 1.5, and
   the outer diameter of the inner core portion is 14.8 micrometers to 20 micrometers, wherein
   the value α is defined by $$n^2(r) = n_2^2[1 - 2(\Delta 2/100) \ast ((r - \text{amax})/((b/2) - \text{amax}))^{\alpha 2}],$$
and a/2 ≤ r < b/2, n(r) represents a refractive index at a position r, $n_2$ represents a maximum refractive index of the inner core portion, r represents a position from a center of the optical fiber in a radial direction, Δ2 is the relative refractive index difference if the inner core portion to the cladding layer, amax is a position from the center of the optical fiber at a point having a largest relative refractive index difference to the cladding layer in the radial direction in a range of a/2 < r < b/2, and when amax is not a single point but is distributed over a wide range, a point at a center of the distribution is taken.

* * * * *